United States Patent [19]

Siems et al.

[11] 3,870,803

[45] Mar. 11, 1975

[54] INSTANT STUFFING MIX

[75] Inventors: Ruth M. Siems; Anthony C. Capossela, Jr., both of Tarrytown, N.Y.; John F. Halligan, Old Greenwich, Conn.; C. Robert Wyss, Scarsdale, N.Y.

[73] Assignee: General Foods Corporation, White Plain, N.Y.

[22] Filed: July 16, 1971

[21] Appl. No.: 163,437

[52] U.S. Cl................. 426/128, 426/343, 426/152
[51] Int. Cl............................................ B65d 85/00
[58] Field of Search...... 99/94, 90 S, 90 NS, 90 NF; 426/128, 343, 152

[56] References Cited
UNITED STATES PATENTS

| | | | |
|---|---|---|---|
| 2,623,825 | 12/1952 | Tressler et al. | 99/94 |
| 3,595,680 | 7/1971 | Fischer et al. | 99/166 |

FOREIGN PATENTS OR APPLICATIONS

| | | |
|---|---|---|
| 206,632 | 11/1923 | Great Britain |
| 326,772 | 3/1930 | Great Britain |

OTHER PUBLICATIONS

Kellogg U.S. Trademark 767,686, Mar. 31, 1964.

Marsh, "The Good Housekeeping Cook Book," Pages 341, 34–36, 1949 Rinehart & Company, Inc., N.Y.

Meta Given's "Modern Encyclopedia of Cooking," Pages 1,222–1,224, Vol. II, 1949, J. G. Ferguson & Associates, Chicago, Ill.

Perkins, "The Fannie Farmer Boston Cooking School Cookbook," Pages 76–78, 1959, Little, Brown & Co., Boston, Mass.

*Primary Examiner*—Raymond N. Jones
*Attorney, Agent, or Firm*—Thomas V. Sullivan; Bruno P. Struzzi

[57] ABSTRACT

An instant stuffing mix is disclosed prepared from dried yeast-leavened corn bread crumb or a mixture of dried yeast-leavened white bread crumb and a member selected from the group consisting of dried yeast-leavened whole wheat bread crumb, corn bread crumb and mixtures thereof. The stuffing mix also contains seasonings, spices and may contain dehydrated vegetables and/or fruit. The stuffing is prepared by combining the vegetables and/or fruit and spices with water, cooking briefly, and subsequently adding the dried bread crumb to the hot aqueous mixture of vegetables and/or fruit and spices.

3 Claims, No Drawings

INSTANT STUFFING MIX

BACKGROUND OF THE INVENTION

This invention relates to an instant stuffing mix. The stuffing may be prepared in as little as about 10 minutes by simple heating of the mix on the stove with water and optionally an oil or a fat. The cooked stuffing of this invention has textural, flavor and color characteristics comparable to home prepared and packaged stuffing which are prepared by cooking over long periods of time in intimate association with the poultry, meat or sea food with which it is to be served.

Poultry or sea food stuffing is ordinarily prepared by mixing a farinaceous ingredient, such as bread pieces, with spices and/or vegetables and sufficient water to form a moist cohesive mass. This mass is then placed in the visceral cavity of poultry or fish and cooked for a prolonged period of time. Cooking in intimate contact with the poultry or sea food is considered necessary if the stuffing is to have the soft texture, flavor and color normally associated with stuffing. Even in the case of packaged stuffing, manufacturers recommend cooking in intimate contact with poultry or fish in order to obtain the proper texture, moisture content and flavor.

This requirement that stuffing ingredients be cooked with the poultry or fish has obvious disadvantages. For example, the consumer must take the time to fill the visceral cavity of fish or poultry and often the cavity must be sewn or otherwise sealed to prevent the stuffing from falling out or drying out. Also, the desire to serve stuffing with the meal imposes severe limitations on the method by which the meat or fish is cooked. For example, stuffed poultry must be roasted or baked, intact. The consumer cannot conveniently serve freshly prepared stuffing with fried or boiled poultry because these methods of cooking are not conducive with the traditional method for preparing stuffing. A further disadvantage associated with the traditional method for preparing stuffing is that the stuffing may become unpalatable after several days of storage in the visceral cavity of the poultry. This may occur as the result of bacteriological infestation in cases where the poultry has not been properly cleaned or has been undercooked.

It is an objective of this invention to provide an instant stuffing which can be prepared separately from the meat or fish with which it is to be served.

A second object of this invention is to provide an instant stuffing which can be prepared in a matter of about 10 to 20 minutes and which has textural, moisture and flavor characteristics comparable to traditional baked stuffing.

SUMMARY OF THE INVENTION

It has now been discovered that an instant stuffing having the textural, moisture and flavor characteristics associated with traditional baked stuffing can be prepared by providing a first component comprising dried yeast-leavened corn bread crumb or a mixture of dried yeast-leavened white bread crumb and a member selected from the group consisting of dried yeast-leavened whole wheat bread crumb, dried corn bread crumb and mixtures thereof; all of said crumb having a certain particle size distribution as hereinafter specified. The instant stuffing of this invention also includes a second component comprising a mixture of spices, seasonings and flavorings in combination optionally with dehydrated vegetables and/or dehydrated fruit. The second component may also contain meat or meat flavored protein analog.

The stuffing mix is most conveniently prepared by mixing the second component comprising the spices and other ingredients with a certain amount of water and optionally a fat or oil, bringing the mixture to a boil and simmering the mixture for several minutes. The first component comprising the bread crumb mixture is then added, with stirring, and the mixture let stand for several minutes.

DETAILED DESCRIPTION OF THE INVENTION

As indicated above, the farinaceous component of the stuffing mix of this invention comprises dried yeast-leavened corn bread crumb or a mixture of dried yeast-leavened white bread crumb and dried yeast-leavened whole wheat and/or corn bread crumb. The term "White Bread" as employed herein refers to bread prepared using a ground flour, preferably wheat flour, which has been freed from bran coat, or bran coat and germ. The term "Whole Wheat Bread" is intended to refer to bread prepared using ground wheat flour which contains the bran coat, or the bran coat and germ. For the purposes of this invention, this term also encompasses bread prepared using a mixture of bran free flour and bran containing flour. Similarly, the term "Corn Bread" refers to bread prepared using corn flour or corn meal, mixtures of these, and mixtures of these with other flour.

It has been found that the nature of the cell structure and overall texture of the dried bread crumb employed in this invention is of great importance if a stuffing which will hydrate in a matter of minutes to the proper texture and mouthfeel is to be prepared. Crumb derived from yeast-leavened bread having a coarse, irregular texture and a firm cellular structure is most satisfactory from the hydration standpoint. This is believed to be due to the fact that the cellular walls in such bread are thicker and firmer, thereby imparting body to the moistened crumb. Examples of this type of texture would be that found in bakery bread, English Muffins, doughnuts and the like. On the other hand, dried crumb derived from bread having a smooth homogeneous texture and a fine cellular structure does not hydrate properly, but becomes mushy or pasty when water is added. This is probably because the cell walls are so thin that the added water breaks down the fragile cellular structure. Examples of this type of texture is that found in pound cake or in the soft, modern breads made by the so called "Continuous Process."

Bread having the necessary coarse, firm texture is best prepared by the so called "Straight Dough" or "Sponge Dough" methods. In both methods, a large amount of time is devoted to fermentation processes helpful in developing the required texture.

In the Straight Dough method, all the ingredients of the bread formula, e.g., flour, sugar, shortening, milk, salt, yeast, water and optionally butter are mixed to form a dough. The dough is then allowed to ferment for several hours slightly above room temperature. The dough is then divided and rounded and given an intermediate proof. Subsequently it is panned and proofed for about an hour at temperatures in the range of 100°–105°F. and 90–95% relative humidity. The dough is then baked in a conventional manner.

The Sponge Dough method differs from the above in that initially a dough is formed by mixing a part of the flour, about 70%, with the yeast and an equivalent amount of water. This "sponge" is permitted to ferment for about 2 to 5 hours. The sponge is then mixed with the remaining ingredients, e.g., flour, shortening, sugar, milk, salt and water. After the dough has redeveloped, it is then processed as in the Straight Dough method by dividing, rounding, intermediate proofing, panning, proofing and baking.

After baking, the bread is staled or dried to a moisture content of below about 15%, preferably below about 5%. The drying is best effectuated by exposing the bread to moderate temperatures and circulating air. Bread crumbs of the appropriate particle size distribution are prepared by grinding the dried bread and screening to the desired particle size.

The particle size distribution of the dried crumb used in this invention is also a significant factor in the preparation of a stuffing mix which will readily hydrate to the proper texture and mouthfeel. Crumb having a particle size larger than 2 U.S. mesh [one-half inch screen size] does not uniformly hydrate a short period of time with the result that dry, semi-dry and moist areas may be found within the same sample. Crumb having a particle size smaller than 50 U.S. mesh tends to over hydrate and become slimy or pasty. For the purposes of this invention it has been found that the particle size distribution of the crumb should be such that at least about 95% by weight of the crumb passes through a 2 mesh screen and no greater than about 5% by weight passes through a 50 mesh screen. It is within this range of particle size distribution that the proper balance of texture, moistness and mouthfeel is obtained. Preferably, at least 50% by weight of the crumb component ranges from 3 to 14 mesh in size.

Crumb prepared from bread which has been processed as described above and which has been screened to the proper particle size will have an average bulk density of at least about 0.200 g/cc, preferably from about 0.250 to about 0.450 g/cc.

The preferred yeast-leavened bread sources of the dried crumb used in the stuffing mix are white bread and whole wheat bread. Stuffing based on white bread crumb has the most pleasing organoleptic characteristics, but tends to be somewhat sticky when hydrated. This stickiness is overcome by blending the white bread crumb with whole wheat or corn bread crumb or mixtures thereof at a ratio of about 30–95% by weight white and correspondingly 5–70% by weight whole wheat or corn bread. The preferred ratio of white bread crumb to whole wheat bread crumb is 50–95% white and 5–50% whole wheat; the preferred ratio of white bread crumb to corn bread crumb is 30–60% white and 40–70% corn. By the same token, stuffing based on whole wheat bread crumb tends to be somewhat dry and non-cohesive; this undesirable characteristic is overcome by the addition of at least 50% by weight white or corn bread crumb or mixtures thereof to the whole wheat crumb. The corn bread crumb used in the above mixtures may be derived from yeast-leavened corn bread. However, conventional corn bread containing milk, corn meal, flour, whole eggs, shortening, baking powder and salt is also a suitable source of dried corn bread crumb to be used in blend with the yeast-leavened white or whole wheat crumb.

On the other hand, corn bread crumb prepared from a yeast-leavened corn bread dough has proven quite satisfactory in the preparation of a stuffing having the required texture and mouthfeel and may comprise 100% of the farinaceous crumb component. Yeast-leavened corn bread may be prepared by forming a dough comprising flour, corn meal, milk, butter, whole eggs, sugar, yeast and salt, and processing this dough by any method, including the Straight Dough or Sponge Dough methods described above.

In addition to the crumb already described, the farinaceous component of the stuffing may also include minor amounts of dried crumb derived from other sources such as rye bread, graham crackers, English Muffins, doughnuts, potato chip fines, and the like. Crumb from these sources may be used to alter the texture, taste, and color of the basic crumb to suit consumer preference.

The second component of the stuffing mix of this invention comprises a mixture of condiments, flavorings and precooked dehydrated vegetables and/or dehydrated fruit. The particular condiments and other ingredients used in this second component will depend on the nature of the meat or fish with which the stuffing is to be served and the flavor desired in the stuffing. Precooked vegetables which may be used include rice, potato, and dehydrated onion, green or red peppers, parsley, celery, carrots and the like. Meat flavoring such as chicken seasoning, poultry seasoning, beef, bacon or pork flavoring is added where appropriate. The composition also may include particles of a meat flavored protein analog such as beef, chicken or bacon flavored protein. Dehydrated fruit pieces such as dehydrated apples, pears, apricots, prunes, raisins and the like may be substituted for all or part of the vegetables present in the stuffing composition. This second component may also contain a fat or oil in powdered form, such as encapsulated spray dried butter, animal fat or vegetable fat. Where such an ingredient is present, the amount of fat or oil added separately before the cooking may be correspondingly reduced.

The stuffing mix is most conveniently prepared from a two package system: One pouch containing the farinaceous component and the second pouch containing the spices, flavorings, vegetables, fruit and other ingredients. The contents of the flavor pouch are first combined with an amount of water in a saucepan sufficient to produce a hydrated stuffing having the desired texture and moistness. Butter or other fats or oils may also be added as it has been found that such an ingredient improves the cohesiveness and texture of the stuffing. This mixture is then brought to a boil, the heat reduced and simmered for about 8 minutes, with occasional agitation. The 8 minute simmer step is required in order to properly rehydrate the dehydrated vegetables or fruit contained in the flavor pouch. This step can be omitted in those instances where these dehydrated components are not present in the composition.

The contents of the pouch containing the farinaceous crumb are then thoroughly mixed with the hot, soup-like flavor base, the saucepan covered and removed from the heat. The stuffing is ready to serve after permitting the mixture to stand for about 5 minutes.

The amount of water, flavoring, bread crumb, vegetables and the like used in preparing the stuffing of this invention will vary depending on the quantity of stuffing to be prepared. Where 3 cups of stuffing is desired, 1½ to 2 cups of water will properly hydrate 150 to 225 grams of dry mix. The moisture content of the stuffing composition should be at least 50% by weight, preferably 60–80% by weight. The crumb component comprises at least 50% by weight of the dry mix, preferably from about 60–95% by weight. Where significant amounts of rice or potato are included in the composition, the crumb is present at the lower end of the 60–95% range. The dehydrated fruit and/or vegetables, where used, are present within the range of about 2 to 30% by weight of the dry mix. The seasonings and flavor components are present to suit taste.

The following examples are illustrative of the invention. Unless otherwise indicated, all bread crumb used in the examples are derived from yeast-leavened bread produced by the Straight Dough method.

The typical screen analysis of the various bread crumb employed in each example is as shown in Table 1.

TABLE 1

|  | White and Whole Wheat Crumb | Corn Crumb |
| --- | --- | --- |
| On U.S. 2 Mesh (½" screen) | 0 | 0 |
| On U.S. 2⅔ Mesh (⅜" screen) | 15 | 0 |
| On U.S. 3½ Mesh | 20 | 13 |
| On U.S. 7 Mesh | 25 | 28 |
| On U.S. 14 Mesh | 20 | 34 |
| On U.S. 50 Mesh | 20 | 25 |

EXAMPLE I

A poultry stuffing is prepared from the following ingredients:

| Ingredient | gms/pkg | % |
| --- | --- | --- |
| White Bread Crumb | 130.00 | 75.45 |
| Whole Wheat Bread Crumb | 20.00 | 11.61 |
| Dehydrated Onion Chips | 6.00 | 3.48 |
| Hydrolyzed Vegetable Protein [HVP-3H3] | 4.40 | 2.55 |
| Air Dried Cross Cut Celery ⅛" | 4.00 | 2.32 |
| Chicken Seasoning (Stange No. 7058) | 3.50 | 2.03 |
| Chicken Seasoning [Busch Boake Allen AF/400] | 2.00 | 1.16 |
| Dehydrated Parsley Flakes | 1.00 | .58 |
| Poultry Seasoning | .70 | .41 |
| Monosodium Glutamate [MSG] | .50 | .29 |
| White Pepper | .20 | .12 |
| Total | 172.30 | 100.00 |

The stuffing is prepared by mixing the contents of the pouch containing all of the above except the bread crumb with 1¾ cups of water and 4 tablespoons of butter in a 2 quart covered saucepan. The mixture was brought to a boil. The heat was reduced and the mixture was simmered for about 8 minutes, stirring occasionally. Next, the contents of the bread crumb pouch was added and the mixture stirred well to blend. The mixture was covered and let stand for about 5 minutes.

The resulting stuffing has a most pleasant poultry flavor and the texture and mouthfeel associated with conventional stuffing prepared by filling the visceral cavity of poultry and roasting for a period of hours.

EXAMPLE II

Corn bread rice stuffing was prepared using the following ingredients:

| Ingredient | gms/pkg | % |
| --- | --- | --- |
| Corn Bread Crumb (non-yeast leavened) | 75.00 | 37.36 |
| White Bread Crumb | 50.00 | 24.91 |
| Rice (Precooked) | 50.00 | 24.91 |
| Dehydrated Onion Chips | 6.00 | 2.99 |
| Chicken Seasoning (Stange No. 7058) | 5.25 | 2.61 |
| HVP-3H3 | 4.40 | 2.19 |
| Air Dried Celery (cross cut ⅛") | 4.00 | 1.99 |
| Chicken Seasoning (Busch Boake Allen AF/400) | 3.00 | 1.49 |
| Parsley Flakes | 1.00 | 0.49 |
| Salt | .75 | 0.37 |
| Poultry Seasoning | .70 | 0.35 |
| MSG | .50 | 0.25 |
| White Pepper | .20 | 0.09 |
| Total | 200.80 | 100.00 |

Stuffing was prepared by mixing and cooking the ingredients as in Example I. The rice is present in the pouch containing the seasonings and vegetables.

EXAMPLE III

Corn bread stuffing was prepared using the following ingredients:

| Ingredient | gms/pkg | % |
| --- | --- | --- |
| Corn Bread Crumb | 175.00 | 87.19 |
| Dehydrated Onion Chips | 6.00 | 2.98 |
| Chicken Seasoning (Stange No. 7058) | 5.25 | 2.61 |
| HVP-3H3 | 4.40 | 2.19 |
| Air Dried Celery (cross cut ⅛") | 4.00 | 1.99 |
| Chicken Seasoning (Busch Boake Allen AF/400) | 3.00 | 1.49 |
| Parsley Flakes | 1.00 | .49 |
| Salt | .75 | .37 |
| Poultry Seasoning | .70 | .35 |
| MSG | .50 | .25 |
| White Pepper | .20 | .09 |
| Total | 200.80 | 100.00 |

Stuffing was prepared by mixing and cooking the ingredients as in Example I.

EXAMPLE IV

Apple Raisin stuffing was prepared using the following ingredients:

| Ingredient | gms/pkg | % |
| --- | --- | --- |
| White Bread Crumb | 130.00 | 62.30 |
| Whole Wheat Bread Crumb | 20.00 | 9.59 |
| Raisins | 20.00 | 9.59 |
| ⅜" Cut apples-Vacu Dry | 15.00 | 7.19 |
| Apple Powder-Vacu Dry | 10.00 | 4.79 |
| Brown Sugar | 8.50 | 4.07 |
| Salt | 3.00 | 1.44 |
| Poultry Seasoning | 2.00 | .96 |
| Cinnamon, gr. | .15 | .07 |
| Total | 208.65 | 100.00 |

Stuffing was prepared by mixing and cooking the ingredients as in Example I.

EXAMPLE V

Seafood stuffing was prepared using the following ingredients:

| Ingredient | gms/pkg | % |
| --- | --- | --- |
| White Bread Crumb | 130.00 | 77.20 |
| Whole Wheat Bread Crumb | 20.00 | 11.88 |

-Continued

| Ingredient | gms/pkg | % |
| --- | --- | --- |
| Dehydrated Onion Chips | 13.00 | 7.72 |
| Salt | 2.30 | 1.36 |
| Dehydrated Parsley Flakes | 1.00 | 0.59 |
| Citric Acid anhydrous | 1.00 | 0.59 |
| Thyme, ground | 0.75 | 0.45 |
| White Pepper | 0.30 | 0.18 |
| GL-5 (Lemon Flavor) | 0.05 | 0.03 |
| Total | 168.40 | 100.00 |

Stuffing was prepared by mixing and cooking the ingredients as in Example I. However, the 8 minute simmer step is not required with this formula since it does not contain difficult to hydrate vegetables such as dried celery, or dried fruit.

Beef or bacon flavored stuffing may be prepared using the basic formula of Example I and substituting the appropriate meat flavorings for the poultry flavoring used in that formula. Minor amounts of beef or bacon flavored vegetable protein analog may also be included in these formulae.

The invention as illustrated focuses on a stuffing mix comprising a two pouch system, one containing the dry flavor ingredients and the other containing the crumb. However, it is to be emphasized that the flavor ingredients may be provided in the form of a dried, pressed cube, similar to a beef bullion cube. Such a cube may be packaged directly with the crumb in wrapped or unwrapped form.

What we claim is:

1. A conveniently packaged stuffing mix for ready hydration to form a stuffing composition comprising:
   i. a stuffing flavor component comprising a mixture of condiments with dehydrated vegetables or dehydrated fruits or mixtures of said vegetables or fruits, and
   ii. a low moisture content farinaceous crumb component, said crumb having a moisture content of less than 15% and comprising a member selected from the group consisting of
   a. yeast-leavened corn bread crumb,
   b. mixtures of yeast-leavened white bread crumb with corn bread crumb or yeast-leavened whole wheat bread crumb or mixtures thereof, and
   c. mixtures of corn bread crumb with yeast-leavened whole wheat crumb or yeast-leavened corn bread crumb or mixtures thereof, and
   said crumb having a particle size such that at least 95% by weight passes through a 2 mesh screen and no greater than 5% by weight passes through a 50 mesh screen,
   each of said components being packaged separately to form a segregated unit package.

2. A process for preparing a stuffing composition comprising providing an aqueous dispersion of a stuffing flavor component comprising a mixture of condiments with dehydrated vegetable or dehydrated fruits or mixtures of said vegetables or fruits, heating said dispersion, and mixing therewith a sufficent amount of a low moisture content farinaceous crumb, said crumb having a moisture content of less than 15% and comprising a member selected from the group consisting of
   a. yeast-leavened corn bread crumb,
   b. mixtures of yeast-leavened white bread crumb with corn bread crumb or yeast-leavened whole wheat bread crumb or mixtures thereof, and
   c. mixtures of corn bread crumb with yeast-leavened whole wheat crumb or yeast-leavened corn bread crumb or mixtures thereof, and
said crumb having a particle size such that at least 95% by weight passes through a 2 mesh screen and no greater than 5% by weight passes through a 50 mesh screen, to provide a stuffing composition having a moisture content of at least 50% by weight.

3. A process for preparing a stuffing composition comprising forming an aqueous dispersion of a stuffing flavor component comprising a mixture of condiments with dehydrated vegetables or dehydrated fruits or mixtures of said vegetables or fruits and water in an amount sufficient to produce a hydrated stuffing, heating said dispersion to a temperature and for a time sufficient to dissolve or hydrate the components of the dispersion, and mixing said heated dispersion with a sufficient amount of a low moisture content farinaceous crumb, said crumb having a moisture content of less than 15% and comprising a member selected from the group consisting of
   a. yeast-leavened corn bread crumb,
   b. mixtures of yeast-leavened white bread crumb with corn bread crumb or yeast-leavened whole wheat bread or mixtures thereof, and
   c. mixtures of corn bread crumb with yeast-leavened whole wheat crumb or yeast-leavened corn bread crumb or mixtures thereof, and
said crumb having a particle size such that at least 95% by weight passes through a 2 mesh screen and no greater than 5% by weight passes through a 50 mesh screen, to provide a stuffing composition having a moisture content of at least 50% by weight.

* * * * *